US008695079B1

(12) United States Patent
Miller et al.

(10) Patent No.: US 8,695,079 B1
(45) Date of Patent: Apr. 8, 2014

(54) ALLOCATING SHARED RESOURCES

(75) Inventors: Kevin C. Miller, Herndon, VA (US);
Mahmoud A. Abuelela, Herndon, VA (US); David Schneider-Joseph, Ashburn, VA (US); Eric J. Brandwine, Haymarket, VA (US)

(73) Assignee: Amazon Technologies, Inc., Reno, NV (US)

( * ) Notice: Subject to any disclaimer, the term of this patent is extended or adjusted under 35 U.S.C. 154(b) by 334 days.

(21) Appl. No.: 12/893,169

(22) Filed: Sep. 29, 2010

(51) Int. Cl.
*H04L 29/06* (2006.01)

(52) U.S. Cl.
USPC ............. 726/10; 709/223; 709/224; 709/226; 709/229

(58) Field of Classification Search
USPC .......................................................... 726/10
See application file for complete search history.

(56) References Cited

U.S. PATENT DOCUMENTS

| | | | | |
|---|---|---|---|---|
| 5,522,070 | A * | 5/1996 | Sumimoto | 718/104 |
| 6,449,614 | B1 * | 9/2002 | Marcotte | 1/1 |
| 7,236,458 | B2 * | 6/2007 | Lee et al. | 370/230 |
| 7,386,615 | B1 * | 6/2008 | Surlaker et al. | 709/226 |
| 7,703,102 | B1 * | 4/2010 | Eppstein et al. | 718/104 |
| 7,707,290 | B2 * | 4/2010 | Bandholz et al. | 709/226 |
| 2002/0093915 | A1 * | 7/2002 | Larson | 370/235 |
| 2002/0191539 | A1 * | 12/2002 | Rawlins et al. | 370/229 |
| 2003/0014468 | A1 * | 1/2003 | Sudhakaran et al. | 709/104 |
| 2003/0014662 | A1 * | 1/2003 | Gupta et al. | 713/200 |
| 2003/0018786 | A1 * | 1/2003 | Lortz | 709/226 |
| 2003/0054798 | A1 * | 3/2003 | Kobayashi | 455/411 |
| 2004/0054915 | A1 * | 3/2004 | Jong et al. | 713/193 |
| 2004/0174855 | A1 * | 9/2004 | Foster et al. | 370/348 |
| 2004/0215578 | A1 * | 10/2004 | Das | 705/77 |
| 2006/0129627 | A1 * | 6/2006 | Phillips et al. | 709/200 |
| 2006/0181411 | A1 * | 8/2006 | Fast et al. | 340/539.13 |
| 2007/0028068 | A1 * | 2/2007 | Golding et al. | 711/170 |
| 2008/0201486 | A1 * | 8/2008 | Hsu et al. | 709/238 |
| 2008/0208978 | A1 * | 8/2008 | Aschauer et al. | 709/206 |
| 2008/0253380 | A1 * | 10/2008 | Cazares et al. | 370/395.53 |
| 2009/0163211 | A1 * | 6/2009 | Kitazoe et al. | 455/436 |
| 2011/0125902 | A1 * | 5/2011 | Ingham et al. | 709/226 |

OTHER PUBLICATIONS

Szeto et al., A Multi-Commodity Flow Based Approach to Virtual Network Resource Allocation, Dec. 2003, IEEE Global Telecommunications Conference, GLOBECOM 2003, vol. 6, pp. 3004-3008.*

* cited by examiner

*Primary Examiner* — Mohammad L Rahman
*Assistant Examiner* — Kenneth Chang
(74) *Attorney, Agent, or Firm* — Thomas Horstemeyer LLP

(57) ABSTRACT

Disclosed are various embodiments for allocating shared resources. A request to allocate a shared isolating resource is received. The shared isolating resource operates to isolate a plurality of customer resources in a multi-tenant environment. In response to the request to allocate, a least recently deallocated shared isolating resource is removed from a pool of available shared isolating resources. The least recently deallocated shared isolating resource is provided to at least one device using the shared isolating resource.

23 Claims, 4 Drawing Sheets

ALLOCATING SHARED RESOURCES

BACKGROUND

Through a technology known as cloud computing, customers now have access to vast amounts of computing resources such as storage space and compute power, as well as services using these resources such as on-demand backup. Providers of these computing resources utilize various types of computing and network devices to implement these services. To make a service accessible to a particular customer while keeping that service separate from other customers, the providers typically provision the computing and network devices so that certain devices share resources or identifiers. However, a malfunctioning device that does not use the proper identifier as intended can result in one customer having access to a computing resource of another customer.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to allocating resources that are shared among multiple devices. These shared resources operate to isolate customer resources in a multi-customer or multi-tenant environment. These customer resources are made available to customer devices through a service gateway. Availability of the shared resources is managed by a shared resource allocator, which manages a pool of available shared resources for each type of resource. The shared resources are allocated on a least-recently-used basis, where in this context "used" means "deallocated." That is, the next resource to be allocated is the one that was deallocated longest ago. Using a least-recently-deallocated allocation scheme allows a greater time to pass before a particular resource is used again, relative to other allocation schemes. This increased time increases the probability that improper use of a deallocated resource by a malfunctioning device can be discovered and addressed.

Figure 1:
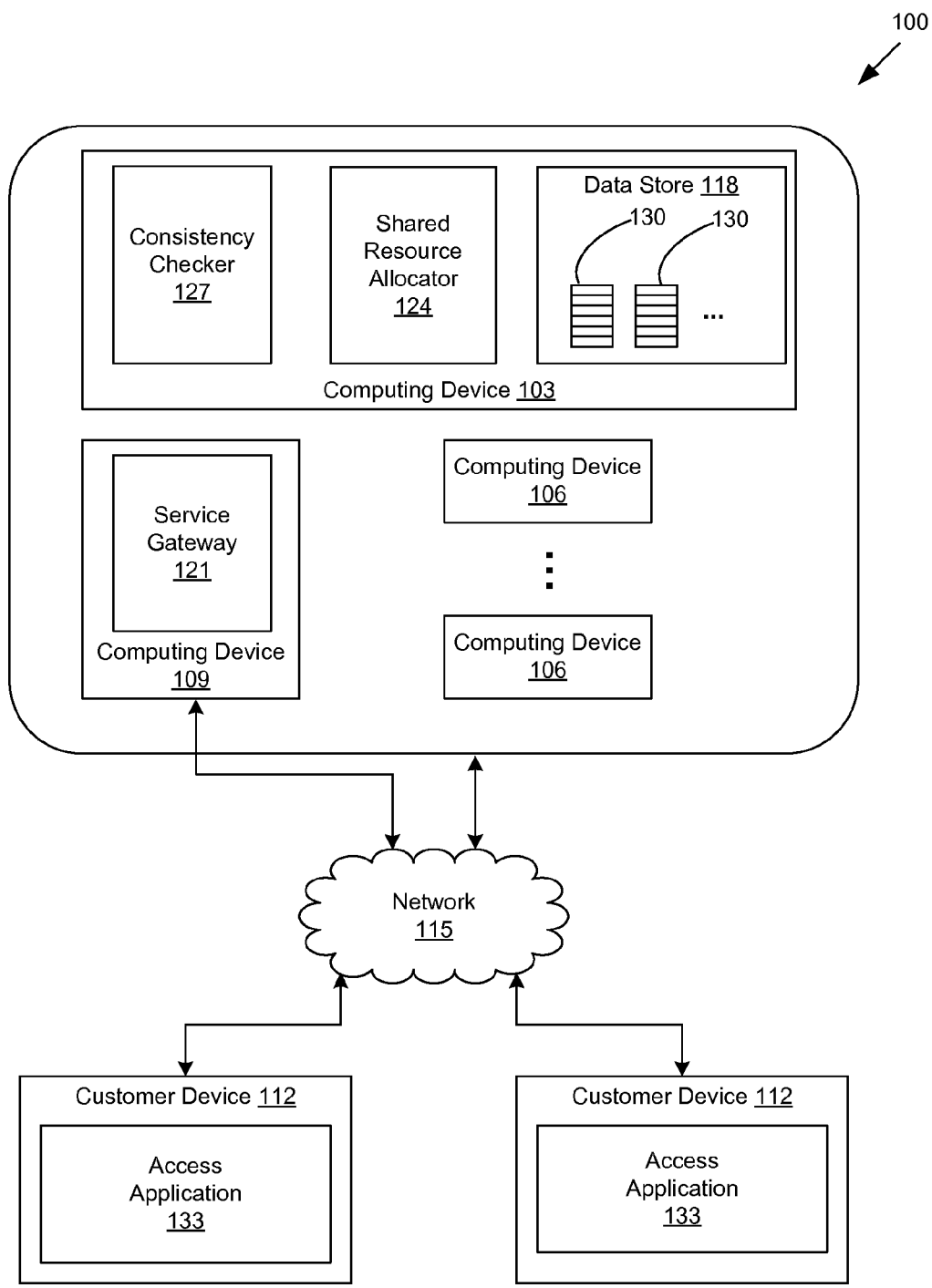
FIG. 1 is a drawing of a networked environment according to various embodiments of the present disclosure.

With reference to FIG. 1, shown is a networked environment 100 according to various embodiments. The networked environment 100 includes a computing device 103, one or more computing devices 106, and at least one computing device 109. The computing device 109 is in data communication with customer devices 112 by way of a network 115. The network 115 includes, for example, the Internet, intranets, extranets, wide area networks (WANs), local area networks (LANs), wired networks, wireless networks, or other suitable networks, etc., or any combination of two or more such networks.

The computing device 103, the computing device 106, and the computing device 109 may be operated by a cloud computing service provider. The computing device 103, 106, or 109, may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. Furthermore, the device 106 may take the form of a network device such as a router, bridge, switch, security gateway, virtual private network gateway, etc. and may incorporate specialized hardware. For purposes of convenience, the computing device 103, the computing device 106, and the computing device 109 are referred to herein in the singular. Even though these computing devices are referred to in the singular, it is understood that a plurality may be employed in the various arrangements, as described above.

Various applications and/or other functionality may be executed in the computing device 103, the computing device 106, and the computing device 109 according to various embodiments. Also, various data is stored in a data store 118 that is accessible to the computing device 103. The data store 118 may be representative of a plurality of data stores, as can be appreciated. The data stored in the data store 118, for example, is associated with the operation of the various applications and/or functional entities described below.

The components executed on the computing device 109, for example, include a service gateway 121. The service gateway 121 is executed to provide resources or services to the customer devices 112. Examples of such resources include storage and compute resources, among others. Examples of such services include a virtual private network (VPN), a virtual private cloud (VPC), an on-demand storage device, etc. The components executed on the computing device 109 may also include other applications, services, processes, systems, engines, or functionality not discussed in detail herein.

The components executed on the computing device 103, for example, include a shared resource allocator 124 and a consistency checker 127. The components executed on the computing device 103 may also include other applications, services, processes, systems, engines, or functionality not discussed in detail herein. The data stored in the data store 118 includes data accessed by the shared resource allocator 124, for example, shared resource pools 130 as well as potentially other data. In various embodiments, the shared resource allocator 124 and the consistency checker 127 may utilize any type of middleware framework to communicate with a client application executing on a customer device 112 or with other applications executing on the computing device 106 and the computing device 109. Examples of such frameworks include remote procedure calls, simple object access protocol (SOAP), representational state transfer (REST), Windows® Communication Foundation, and other frameworks.

The shared resource allocator 124 is executed to allocate and deallocate shared resources in response to requests from devices or components that use these resources. A shared resource is one that is utilized by more than one of the computing devices 106. In some embodiments, the shared resource is simultaneously used by more than one of the computing devices 106. In other embodiments, the shared resource is used by only one computing device 106 at a time, but is time-shared among customers, for example, the shared resource is allocated to one customer for a period of time and then allocated to another customer. Each shared resource has a type and a value. Types of shared resources include (for example) port numbers, device paths, slot numbers, interface identifiers, virtual local area network (VLAN) identifiers, security associations (SAs), etc. These resources may have a fixed size or a variable size. For each type of managed resource, the shared resource allocator 124 maintains a shared resource pool 130 which contains available (never allocated or deallocated) resources. The consistency checker 127 is executed to query the devices or components using the shared resources and to determine whether each resource is in a consistent state. For example, the consistency checker 127 may determine whether a resource that is reported as in use by a device or component is actually in the deallocated state. In some embodiments, at least one of the shared resources managed by the shared resource allocator 124 is an isolating resource which, as used by a computing device 106, operates to isolate customer resources in a multi-tenant environment. These customer resources are then made available to the customer devices 112 through the service gateway 121. In some embodiments, the shared isolating resource is a security token or security association which operates to isolate security contexts in a multi-tenant environment.

The customer device 112 is representative of a plurality of devices that are associated with various customers. The customer device 112 may be coupled to the network 115. The customer device 112 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, an electronic book reader, or other devices with like capability.

The customer device 112 may be configured to execute various applications such as an access application 133 and other applications. The access application 133 may be executed in a customer device 112, for example, to obtain access to resources and/or services provided by the device 109 as described above. The customer device 112 may be configured to execute applications beyond access application 133 such as, for example, browser applications, email applications, instant message applications, and/or other applications.

Next, a general description of the operation of the various components of the networked environment 100 (FIG. 1) is provided. To begin, a request to allocate a customer resource is received by the service gateway 121 from the access application 133 executing on the customer device 112. Allocating a customer resource involves provisioning one or more of the computing devices 106, where provisioning includes allocating a shared resource. Therefore, the service gateway 121 makes a request to the shared resource allocator 124 to allocate the particular type of shared resource to accomplish this provisioning. The request may include other context information such as a list of devices that will share the resource.

The shared resource allocator 124 examines the type of shared resource in the request and selects the appropriate shared resource pool 130 based on the type. The shared resource allocator 124 then locates the oldest, or least recently deallocated, shared resource in the shared resource pool 130. The shared resource allocator 124 allocates the oldest shared resource by removing it from the pool 130 and provides information about the newly-allocated shared resource to the requesting service gateway 121. The shared resource allocator 124 may also distribute the newly-allocated shared resource to the computing devices 106 which share the resource. This distribution may be performed in a staggered manner, so that over time the shared resource reaches a consistent state where all sharing devices are aware of the new allocation.

Figure 2:
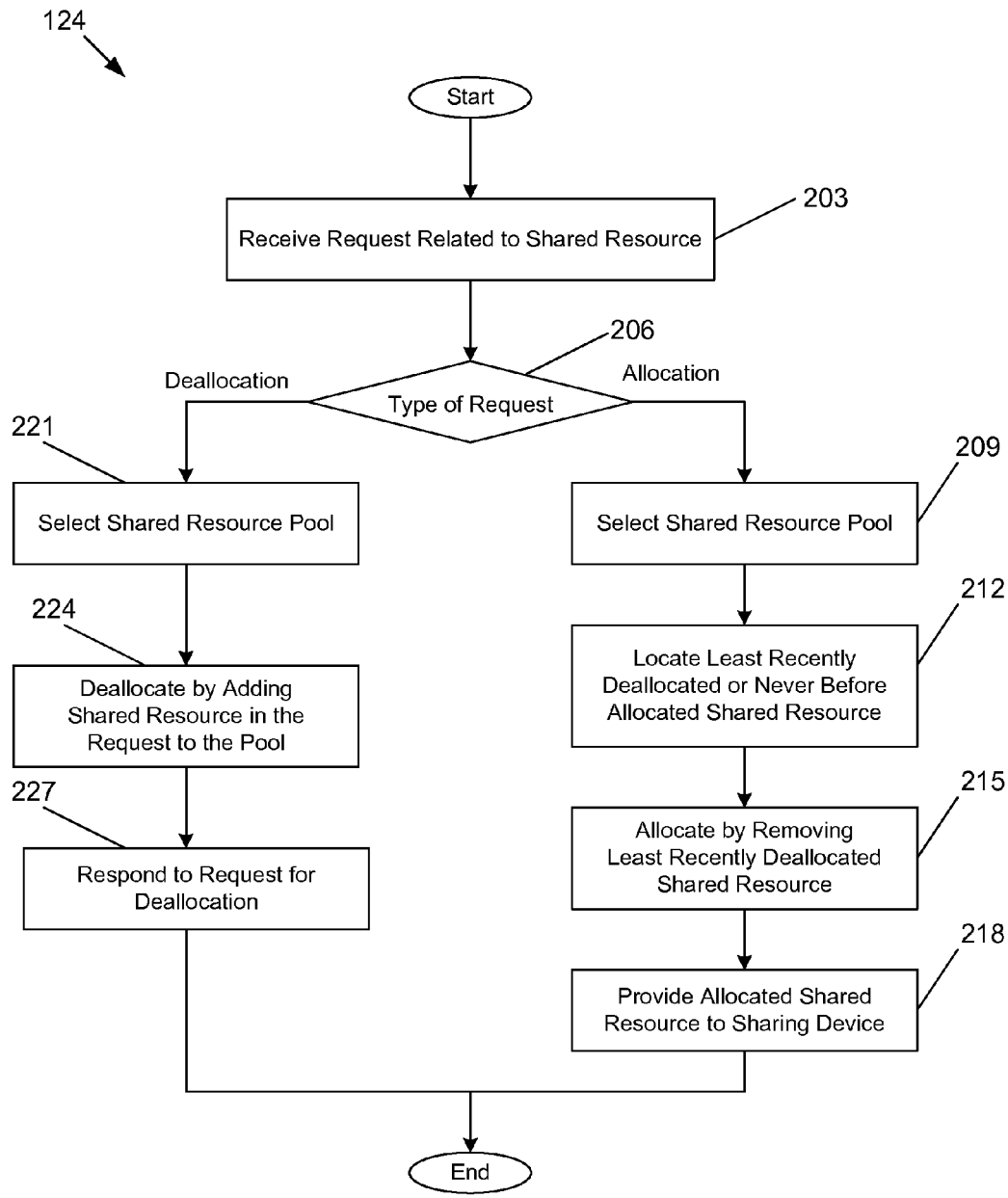
FIG. 2 is a diagram illustrating an example of the operation of a product reference locator application executed in a computing device in the networked environment of FIG. 1 according to various embodiments of the present disclosure.

Turning now to FIG. 2, shown is a flowchart that provides one example of the operation of a portion of the shared resource allocator 124 (FIG. 1) according to various embodiments. It is understood that the flowchart of FIG. 2 provides merely an example of the many different types of functional arrangements that may be employed to implement the operation of the portion of the shared resource allocator 124, as described herein. As an alternative, the flowchart of FIG. 2 may be viewed as depicting an example of steps of a method implemented in the computing device 103 (FIG. 1) according to one or more embodiments.

Beginning at box 203, the shared resource allocator 124 (FIG. 1) receives a request related to a shared isolating resource. As noted above, the shared isolating resource is one that is shared among multiple computing devices 106 (FIG. 1). The request may be triggered by, for example, a request to set up a customer resource (e.g., a virtual private network, an on-demand storage device, a virtual private network on a virtual network, etc.). The request may also be triggered by, for example, a request to access a customer resources (e.g., a request to access data on a storage volume.) Next, at box 206 the shared resource allocator 124 determines the type of request received in box 203. If at box 206 it is determined that the request is an allocation request, the shared resource allocator 124 continues to box 209. However, if at box 206 it is determined that the request is a deallocation request, the shared resource allocator 124 continues to box 221.

At box 209, the shared resource allocator 124 examines the request and determines the appropriate shared resource pool 130, based on context information in the request (e.g., resource type). As noted above, the shared resource pool 130 contains deallocated resources which are therefore available for allocation. At box 212, the shared resource allocator 124 locates the least recently deallocated shared isolating resource in the shared resource pool 130. In some embodiments, the shared resource allocator 124 checks for a shared isolating resource that has never been allocated before allocating from the pool of deallocated resources. For example, if a particular identifier has an identifier space of 0-4095, and this space contains an identifier which has not yet been allocated, the shared resource allocator 124 may allocate by increasing the sequence number of the last allocated identifier rather than allocating from the pool of deallocated resources.

Various data structures may be used for the shared resource pool 130. The shared resource pool 130 may take the form of a queue or a linked list, for example, with allocations removing from one end of the queue/list and deallocations adding to the other end of the queue/list. If such a mechanism is used, the least recently deallocated entry is always at the end of the queue. Alternatively, a table may be used and the time of deallocation stored in the table, such that the least recently deallocated entry can be determined from the time.

Next, at box 215, the shared resource allocator 124 removes the least recently deallocated shared isolating resource from the shared resource pool 130, thus making it unavailable for allocation. In some embodiments, access to the shared resource pool 130 is controlled via a lock or mutex, where the lock is acquired before allocating from the shared resource pool 130 and released after allocating from the shared resource pool.

At box 218, the shared resource allocator 124 provides the newly allocated shared isolating resource (the one located in box 212) to at least one of the computing devices 106 that is sharing the resource. The newly allocated shared isolating resource may be provided as a response to the request from box 203, or may be provided in a separate notification message that is sent to all of the computing devices 106 that are sharing the resource. To determine which computing devices 106 are sharing the shared isolating resource, the shared resource allocator 124 may utilize a sharing context to store information about a shared resource. For example, the sharing context may store an identifier for the customer request that results in the need for a shared resource, the shared resource type, and a list of all computing devices 106 that will share the resource. After providing the newly allocated shared isolating resource in box 218, the process of FIG. 2 is complete.

If at box 206 it is determined that the request is a deallocation request, the shared resource allocator 124 then continues to box 221. At box 221, the shared resource allocator 124 examines the request and determines the appropriate shared resource pool 130, based on the resource type in the request. Next, at box 224, the shared resource allocator 124 obtains the shared isolating resource from the request and deallocates the shared isolating resource by adding the resource to the shared resource pool 130. In some embodiments, deallocation may also involve storing a time of deallocation in the shared resource pool 130. In some embodiments, access to the shared resource pool 130 is controlled via a lock or mutex, where the lock is acquired before deallocating and released after deallocating. At box 227, the shared resource allocator 124 sends a response to the request from box 203, indicating that the shared isolating resource has been deallocated. The process of FIG. 2 is then complete.

Figure 3:
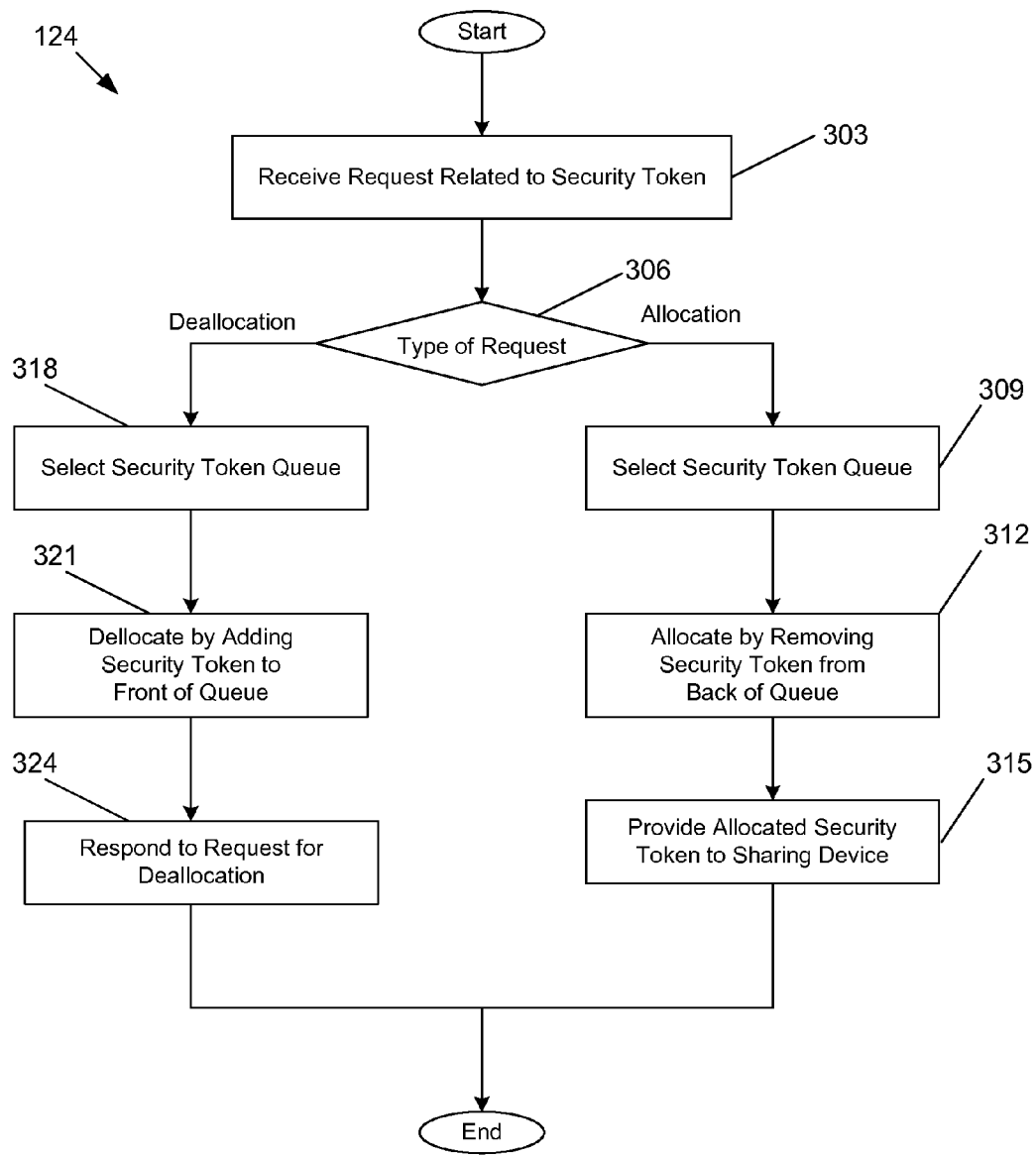
FIG. 3 is a flowchart illustrating another example of functionality implemented as portions of a product reference locator application executed in a computing device in the networked environment of FIG. 1 according to various embodiments of the present disclosure.

Referring now to FIG. 3, shown is a flowchart that provides one example of the operation of a portion of the shared resource allocator 124 (FIG. 1) according to various embodiments. It is understood that the flowchart of FIG. 3 provides merely an example of the many different types of functional arrangements that may be employed to implement the operation of the portion of the shared resource allocator 124 as described herein. As an alternative, the flowchart of FIG. 3 may be viewed as depicting an example of steps of a method implemented in the computing device 103 (FIG. 1) according to one or more embodiments.

Beginning at box 303, the shared resource allocator 124 receives a request related to a security token. As noted above, the security token is shared among multiple computing devices 106 and operates to keep security contexts separate in a multi-tenant environment. The request may be triggered by, for example, a request to set up a customer resource (e.g., a virtual private network, etc.). Next, at box 306 the shared resource allocator 124 determines the type of request received in box 303. If at box 306 it is determined that the request is an allocation request, the shared resource allocator 124 continues to box 309. However, if at box 306 it is determined that the request is a deallocation request, the shared resource allocator 124 continues to box 318.

At box 309, the shared resource allocator 124 examines the request and determines the appropriate shared resource pool 130 (FIG. 1), based on context information in the request. In the embodiment of FIG. 3, the pool 130 is implemented with a queue. The shared resource pool 130 contains deallocated resources, here security tokenS, which are therefore available for allocation. At box 312, the shared resource allocator 124 removes the entry at the back of the queue, thus making it unavailable for allocation. Because entries are added to the front of the queue, the back of the queue represents the least recently added (deallocated) security token in the queue.

Next, at box 315 the shared resource allocator 124 provides the newly allocated security token (the one removed in box 312) to at least one of the computing devices 106 that is sharing the resource. The newly allocated security token may be provided as a response to the request from box 303, or may be provided in a separate notification message that is sent to all the computing devices 106 that are sharing the security token. To determine which computing devices 106 are sharing the security token, the shared resource allocator 124 may utilize a sharing context to store information about a security token. For example, the sharing context may store an identifier for the customer request that results in the need for a security token, the token type, and a list of all computing devices 106 that will share the security token. After providing the newly allocated resource in box 315, the process of FIG. 3 is complete.

If at box 306 it is determined that the request is a deallocation request, the shared resource allocator 124 then continues to box 318. At box 318, the shared resource allocator 124 examines the request and determines the appropriate shared resource pool 130, here a queue. The determination is made based on context information in the request. Next, at box 321, the shared resource allocator 124 obtains the security token from the request and deallocates the security token by adding the security token to the front of the queue. At box 324, the shared resource allocator 124 sends a response to the request from box 303, indicating that the security token was deallocated. The process of FIG. 3 is then complete.

Figure 4:
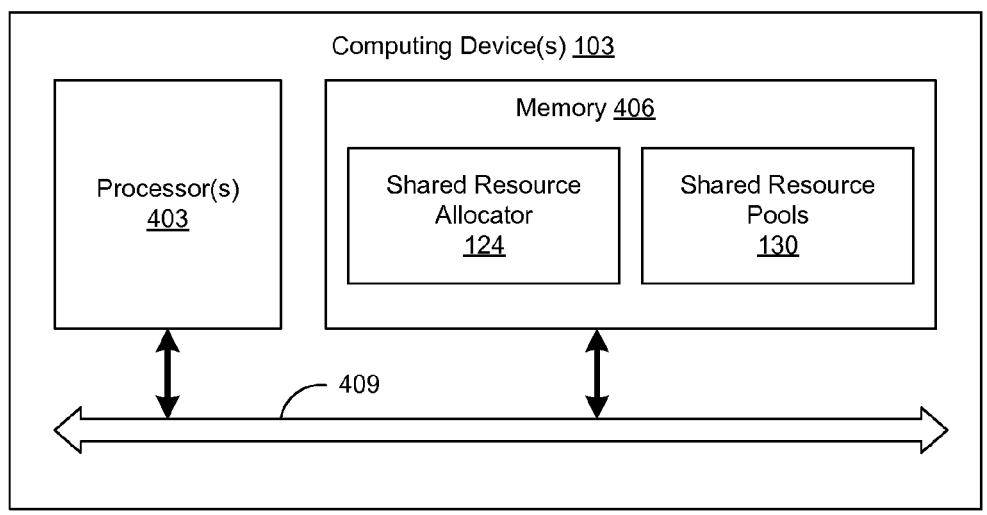
FIG. 4 is a schematic block diagram that provides one example illustration of a computing device employed in the networked environment of FIG. 1 according to various embodiments of the present disclosure.

Moving on to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like computing device. The local interface 409 may comprise, for example, a data bus with an accompanying address/control bus or other bus structure, as can be appreciated.

Stored in the memory 406 are both data and several components that are executable by the processor 403. In particular, stored in the memory 406 and executable by the processor 403 are the shared resource allocator 124 and potentially other applications. Also stored in the memory 406 may be a data store 118 and other data. In addition, an operating system may be stored in the memory 406 and executable by the processor 403. While not illustrated, the customer device 112 also includes components like those shown in FIG. 4, whereby the access application 133 is stored in a memory and executable by a processor. While not illustrated, the computing device 109 also includes components like those shown in FIG. 4, whereby the service gateway 121 is stored in memory and executable by a processor.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, Javascript, Pen, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors and the memory 406 may represent multiple memories that operate in parallel processing circuits, respectively. In such a case, the local interface 409 may be an appropriate network 115 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the shared resource allocator 124, the consistency checker 127, the service gateway 121, and other various systems described herein, may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the shared resource allocator 124. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the shared resource allocator 124, the consistency checker 127, and the service gateway 121, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s)

Therefore, the following is claimed:

1. A computer-implemented method comprising the steps of:
   receiving a request in at least one computing device to allocate a security token, the security token being shared among a plurality of devices and operating to separate a plurality of virtual networks in a multi-tenant networked environment, wherein each of the plurality of virtual networks operates as a separate security context in the multi-tenant networked environment;
   in response to the request to allocate, determining, via the at least one computing device, whether a never-before-allocated security token is available;
   when the never-before-allocated security token is available, allocating, via the at least one computing device, the never-before-allocated security token;
   when the never-before-allocated security token is unavailable, removing, via the at least one computing device, a least recently deallocated security token from a pool of available security tokens, thereby allocating the least recently deallocated security token;
   providing, via the at least one computing device, the allocated token to at least one of the plurality of devices;
   receiving, via the at least one computing device, a request to deallocate another security token;
   in response to the request to deallocate, adding, via the at least one computing device, the another security token to the pool of available security tokens; and
   making the plurality of devices available through a service gateway.

2. The method of claim 1, wherein at least one of the plurality of devices is a router.

3. The method of claim 1, wherein at least one of the plurality of devices is a virtual private network gateway.

4. The method of claim 1, wherein the security token is selected from a queue of security tokens including at least one of: a virtual local area network (VLAN) identifier, a port number, a slot number, an interface identifier, and a security association.

5. The method of claim 1, wherein the request to allocate the security token is in response to a request to provision a virtual private network, a virtual network, or a virtual private cloud hosted in the multi-tenant environment.

6. The method of claim 1, wherein the security token is time-shared among the plurality of devices.

7. The method of claim 1, further comprising the step of correcting, via the at least one computing device, an error condition where at least one of the plurality of devices within the multi-tenant environment continues to use the security token after deallocation of the security token.

8. A system, comprising:
   at least one computing device comprising a processor and a memory; and
   a shared resource allocator executable in the at least one computing device, the shared resource allocator comprising:
   logic that receives a request to allocate a shared isolating resource in response to a request from a customer of a service provider to set up a virtual network for the customer within a multi-tenant networked environment, the shared isolating resource operating to isolate a plurality of virtual networks set up within the multi-tenant networked environment;
   logic that, in response to the request to allocate, removes a least recently deallocated shared isolating resource from a pool of available shared isolating resources; and
   logic that distributes the least recently deallocated shared isolating resource to at least one device hosting at least a portion of the virtual network for the customer, wherein the at least one device is configured to use the shared isolating resource to isolate the virtual network for the customer from other virtual networks within the multi-tenant networked environment, wherein each virtual network is treated as a separate security context in the multi-tenant networked environment.

9. The system of claim 8, wherein the shared isolating resource is simultaneously shared among a plurality of devices that collectively host the virtual network for the customer.

10. The system of claim 8, wherein the shared isolating resource is time-shared among a plurality of devices.

11. The system of claim 8, wherein the pool of available shared isolating resources is implemented by a queue.

12. The system of claim 8, wherein the shared isolating resource has a type and a value.

13. The system of claim 8, wherein the shared isolating resource comprises a fixed size identifier.

14. The system of claim 8, wherein the shared isolating resource is selected from the group consisting of: a virtual local area network (VLAN) identifier, a port number, a slot number, an interface identifier, a device path, and a security association.

15. A method, comprising the steps of:
   receiving, by one or more computing systems of a service provider, a request from a customer of the service provider to set up a virtual private cloud for the customer in a networked environment;
   after receipt of the request, provisioning, by the one or more computing systems, one or more computer devices to host the virtual private cloud for the customer and selecting a least recently deallocated shared isolating resource from a pool of available shared isolating resources to use to isolate the virtual private cloud from other virtual private clouds within the networked environment;
   providing, by the one or more computing systems, the selected shared isolating resource to the one or more computing devices provisioned to host the virtual private cloud for the customer, wherein the one or more computing devices are configured to use the selected shared isolating resource to isolate the virtual private cloud from the other virtual private clouds within the networked environment; and
   determining, by the one or more computing systems, whether a never-before-allocated shared isolating resource is available; and
   if available, allocating the never-before-allocated shared isolating resource by the one or more computing systems instead of removing the least recently deallocated shared isolating resource.

16. The method of claim 15, wherein the shared isolating resource is simultaneously shared among a plurality of computer systems provisioned to host the virtual private cloud.

17. The method of claim 15, wherein the shared isolating resource is time-shared among a plurality of devices.

18. The method of claim 15, wherein the shared isolating resource further operates to separate a plurality of security contexts in the networked environment.

19. The method of claim 15, wherein the request to allocate is associated with a customer request to create a virtual network.

20. The method of claim 15, wherein the request to allocate is associated with a customer request to create a virtual private network (VPN) connection on a virtual network.

21. The method of claim 15, wherein the shared isolating resource comprises a variable size identifier.

22. The method of claim 15, wherein the shared isolating resource is selected from the group consisting of: a virtual local area network (VLAN) identifier, a port number, a slot number, an interface identifier, and a security association.

23. The method of claim 15, further comprising the steps of:

deallocating, by the one or more computing devices, the shared isolating resource upon receiving a request to deallocate from a last remaining computing device hosting the virtual private cloud and known to a consistency checker to be using the shared isolating resource;

querying, via the consistency checker, a plurality of computing devices within the networked environment to confirm the deallocated shared isolating resource is no longer in use by any of the plurality of computing devices hosting the virtual private cloud within the worked environment after deallocation of the shared isolating resource from the last remaining computing device known to the consistency checker; and correcting, by the one or more computing devices, an error condition where at least one of the plurality of computing devices within the networked environment continues to use the deallocated shared isolating resource after deallocation of the shared isolating resource.

\* \* \* \* \*